United States Patent
Antonuccio et al.

(10) Patent No.: US 7,983,033 B2
(45) Date of Patent: Jul. 19, 2011

(54) MOUNTING ASSEMBLY FOR A STORAGE DEVICE

(75) Inventors: Robert S. Antonuccio, Burlington, MA (US); Timothy W. Olesiewicz, Dublin, CA (US); Brett C. Ong, San Jose, CA (US)

(73) Assignee: Oracle America, Inc., Redwood Shores, CA (US)

( * ) Notice: Subject to any disclaimer, the term of this patent is extended or adjusted under 35 U.S.C. 154(b) by 237 days.

(21) Appl. No.: 12/192,489

(22) Filed: Aug. 15, 2008

(65) Prior Publication Data
US 2010/0039765 A1  Feb. 18, 2010

(51) Int. Cl.
*H05K 7/14* (2006.01)
(52) U.S. Cl. ......... 361/679.34; 361/679.35; 361/679.02; 361/807; 312/223.2
(58) Field of Classification Search ............. 361/679.33, 361/679.34, 679.35, 679.36, 679.37, 679.38, 361/679.39, 724–727, 807, 679.02; 312/223.1–223.2
See application file for complete search history.

(56) References Cited

U.S. PATENT DOCUMENTS

| | | | |
|---|---|---|---|
| 5,886,869 A * | 3/1999 | Fussell et al. ............ | 361/679.31 |
| 6,735,043 B2 * | 5/2004 | Bernett et al. ............. | 360/97.01 |
| 7,221,565 B2 * | 5/2007 | Ko ............................ | 361/679.34 |
| 7,515,407 B2 * | 4/2009 | Goodman et al. ....... | 361/679.34 |
| 2003/0011974 A1* | 1/2003 | Curlee et al. .................. | 361/683 |
| 2009/0097195 A1* | 4/2009 | Colligan .................. | 361/679.34 |
| 2009/0097196 A1* | 4/2009 | Peng et al. .............. | 361/679.34 |

* cited by examiner

*Primary Examiner* — Jayprakash N Gandhi
*Assistant Examiner* — Ingrid Wright
(74) *Attorney, Agent, or Firm* — Park, Vaughan, Fleming & Dowler LLP; Steven E Stupp

(57) ABSTRACT

A mounting assembly includes two side rails that mechanically couple to at least two sides on an exterior of a device, where a given side rail includes one or more circumferential edges that define one or more holes on a surface and into an interior of the given side rail, and the surface is approximately parallel to one of the at least two sides on the exterior of the device. Moreover, the mounting assembly includes mechanical collars that mechanically couple to mechanical couplers that mechanically couple the mounting assembly to a chassis in a computer system, where a given mechanical collar is included in a given hole in the given side rail. Additionally, the mounting assembly includes energy-absorbing material encapsulating the mechanical collars, where the energy-absorbing material is positioned between an outer surface of the given mechanical collar and an inner surface of the given hole.

19 Claims, 3 Drawing Sheets

MOUNTING ASSEMBLY FOR A STORAGE DEVICE

RELATED APPLICATIONS

This application is related to pending U.S. patent application entitled "Multi-Dimensional Hard Disk Drive Vibration Mitigation," by Kenny C. Gross, Anton Bougaev, Aleksey M. Urmanov and David K. McElfresh, having Ser. No. 12/179,012, filing date Jul. 24, 2008, the contents of which are hereby incorporated by reference.

BACKGROUND

1. Field of the Invention

The present invention relates to techniques for improving the performance of storage devices. More specifically, the present invention relates to techniques for controlling vibration modes in storage devices.

2. Related Art

Vibration-related problems are increasingly prominent in high-performance computer systems, such as servers, mainframes, and supercomputers. These vibration-related problems may be caused by several factors. First, cooling fans have become larger, more numerous, and operate at higher rotational speeds to compensate for the increased heat generated by components, such as integrated circuits. Moreover, cheaper and more lightweight materials, which are currently used in the chassis and support structures, are less effective at dampening vibrations than heavier and more expensive materials. In addition, newer generations of storage devices, such as hard-disk drives (HDDs), are more sensitive to vibration-induced degradation.

In particular, the storage density and performance of HDDs continue to increase. At these increased densities, a write head of an HDD may be required to write a track that is less than 20 nanometers in width. Moreover, the write head may be separated from a corresponding platter by a distance of several nanometers. In addition, the platter may be spinning at speeds of up to 15,000 revolutions per minute (rpm). These factors have caused the latest generation of HDDs to be more sensitive to vibrations.

Vibration-related problems may cause the HDDs within a computer system to experience reductions in read and write throughput. Furthermore, the increased internal latencies caused by the degraded throughput may cause software applications to hang, crash, and/or reboot.

Unfortunately, these problems are often exacerbated by existing mounting assemblies (such as drive brackets) that are used to position HDDs in a computer system. Typically, mounting assemblies (and their associated HDDs) are designed to be easily removed and inserted from the computer system, which results in increased mechanical tolerances and larger gaps between the mounting assemblies and corresponding slots in the computer system. However, these gaps allow increased vibration of HDDs in a computer system, with a commensurate impact on HDD and computer-system performance. Furthermore, it is often difficult to modify existing mounting assemblies to address these problems without impacting the ease with which the HDDs can be inserted and removed, and/or impeding cooling airflow.

Hence, what is needed is a mounting assembly for storage devices without the above-described problems.

SUMMARY

One embodiment of the present invention provides a mounting assembly for a device. This mounting assembly includes two side rails that mechanically couple to at least two sides on an exterior of a device, where a given side rail includes one or more circumferential edges that define one or more holes on a surface and into an interior of the given side rail, and the surface is approximately parallel to one of the at least two sides on the exterior of the device. Moreover, the mounting assembly includes mechanical collars that mechanically couple to mechanical couplers that mechanically couple the mounting assembly to a chassis in a computer system, where a given mechanical collar is included in a given hole in the given side rail. Additionally, the mounting assembly includes energy-absorbing material encapsulating the mechanical collars, where the energy-absorbing material is positioned between an outer surface of the given mechanical collar and an inner surface of the given hole.

In some embodiments, the two side rails are mechanically coupled to each other. For example, the two side rails may snap together, thereby maintaining positions of the two side rails relative to the exterior of the device and to each other.

In some embodiments, the mechanical couplers include screws and the mechanical collars are threaded to mechanically couple to the screws. Moreover, the mechanical collars may include molded nylon.

In some embodiments, the energy-absorbing material includes an elastomer.

In some embodiments, the device is sensitive to mechanical vibration or mechanical shock. For example, the device may include a storage device, such as a hard-disk drive (HDD).

In some embodiments, the given side rail has a top edge and a bottom edge, and the given side rail includes at least two mechanically compliant structures protruding above the top edge at different positions along the top edge. These mechanically compliant structures may include springs. Moreover, the springs may be integrated into the given side rail. Note that the mechanically compliant structures may position the device in a slot in the chassis so that the bottom edge of the given side rail is in contact with the chassis.

In some embodiments, the given side rail is mechanically coupled to the device so that there is an offset between the bottom edge of the given side rail and a bottom surface of one of the at least two sides on the exterior of the device. Furthermore, an energy-absorbing material may be mechanically coupled to another surface of the given side rail along a portion of the given side rail between the bottom surface of the one of the at least two sides on the exterior of the device and the bottom edge of the given side rail. This energy-absorbing material may include an elastomer. Additionally, the energy-absorbing material may be integrated into the given side rail or may be mechanically coupled to the given side rail using an adhesive.

Another embodiment provides an apparatus that includes the device and the mounting assembly.

Another embodiment provides a computer system that includes the apparatus positioned in a slot in a chassis.

BRIEF DESCRIPTION OF THE FIGURES

Note that like reference numerals refer to corresponding parts throughout the drawings.

DETAILED DESCRIPTION

Figure 1:
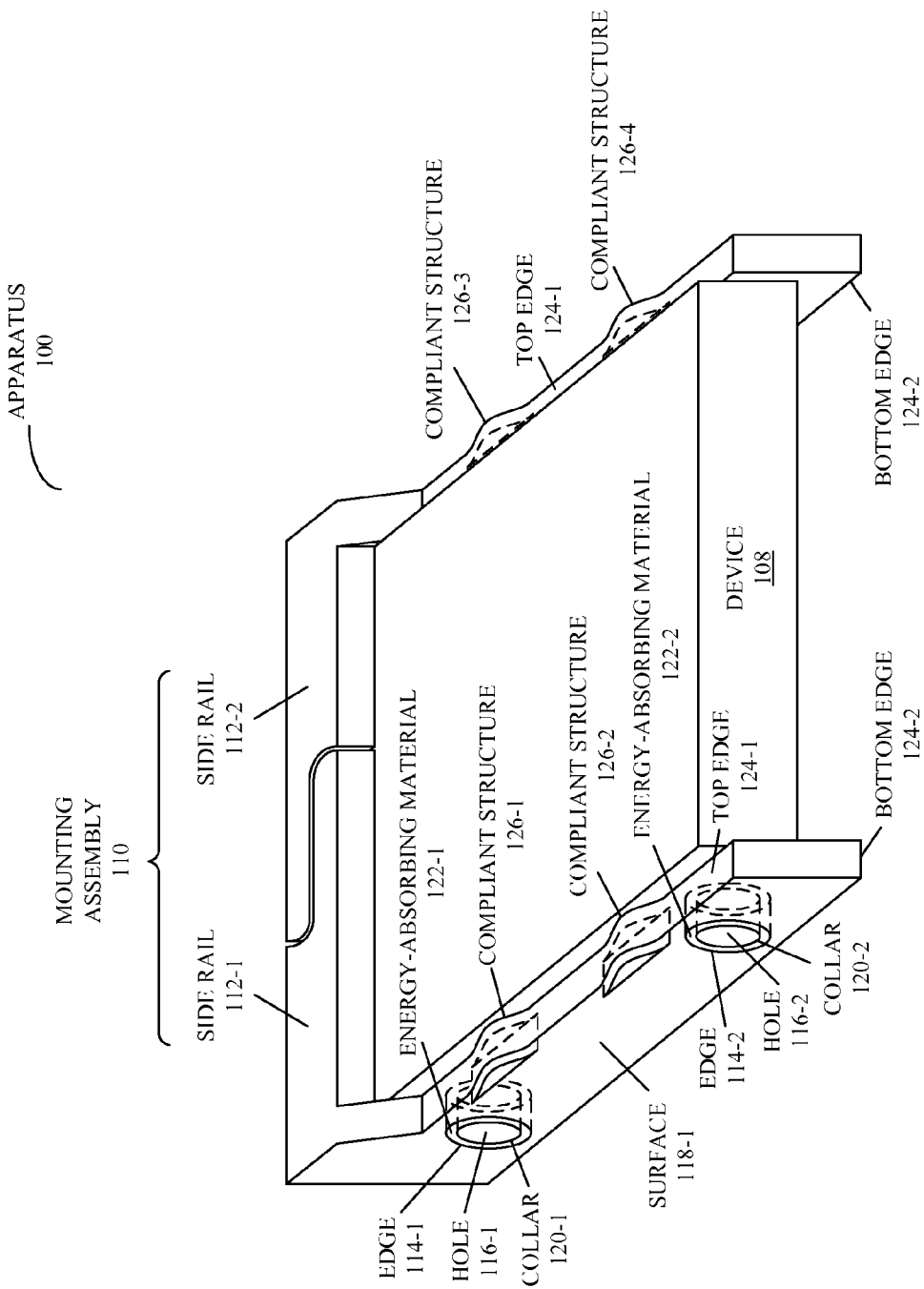
FIG. 1 is a block diagram illustrating an apparatus in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a mounting assembly for a device (such as a vibration-sensitive storage device), an apparatus that includes the mounting assembly and the device, and a computer system that includes one or more instances of the apparatus are described. This mounting assembly includes a variety of vibration-damping features, including: isolating screw mounts; integrated springs in the side rails; an offset region between a bottom edge of the side rail and the bottom of the device; and/or a damping material in the offset region. These vibration-damping features may: eliminate direct contact between the device and a surrounding enclosure (such as a slot) in the computer system; accommodate variations in the size of the enclosure; and/or increase the natural vibration frequencies of the mechanical assembly.

In this way, the mechanical assembly may reduce the impact of vibrations in the computer system on the device, and thus, may increase the performance of the device (such as the read and write throughput). Moreover, the mechanical assembly may provide vibration damping without changing the enclosure, and without affecting the ease with which the device can be installed and removed. Consequently, the mounting assembly may provide a low-cost and easily implemented solution for the vibration-sensitivity of many storage devices.

Note that the computer system may include, but is not limited to: a server, a laptop computer, a personal computer, a work station, a mainframe computer, a blade, an enterprise computer, a data center, portable-computing device, a supercomputer, a network-attached-storage (NAS) system, a storage-area-network (SAN) system, and/or another electronic computing device. Moreover, note that the computer system may be at one location or may be distributed over multiple, geographically dispersed locations.

In the discussion that follows, HDDs are used as an illustrative example of vibration-sensitive storage devices. However, in other embodiments the mounting apparatus may be used with a wide variety of vibration-sensitive devices other than HDDs.

An HDD is a precise mechanical and electronic device that operates using closely spaced moving parts. Specifically, HDDs may include one or more rapidly spinning platters and one or more heads. The heads may be used to read from and write to sub-micron-sized regions corresponding to bits on the platters. Furthermore, the heads may be positioned in close proximity to the platters. For example, a high-end HDD may spin at 15,000 revolutions per minute (rpm), may use read-and-write heads hovering nanometers from the platters, and may store nanometer-sized bits on the platters. Advances in HDD technology may continue to produce HDDs with increasing rotational speed and density. Consequently, forces associated with vibrations may adversely affect HDD performance and cause problems with latency and/or application execution. Note that HDDs from different vendors may be sensitive to different types of vibration. Moreover, note that the vibration sensitivity may include sensitivity to: linear vibration modes, rotational vibration modes; and/or transient vibrations (such as mechanical shock).

We now describe embodiments of a mounting assembly that damps or reduces the impact of vibrations. FIG. 1 presents a block diagram illustrating an apparatus 100 that includes a device 108 (such as an HDD) and a mounting assembly 110. This mounting assembly includes two side rails 112 (which are sometimes referred to as drive brackets) that are configured to mechanically couple to at least two sides on an exterior of a device 108. This mechanical coupling may occur via mounting couplers, such as screws, that attach the side rails 112 to the device 108. Alternatively, the two side rails 112 may mechanically couple to each other. For example, the two side rails 112 may snap together, thereby maintaining positions of the two side rails 112 relative to the exterior of the device 108 and to each other.

A given side rail, such as side rail 112-1, may include one or more circumferential edges 114 that define one or more holes 116 on an external surface 118 of the given side rail and into an interior of the given side rail. This surface may be approximately parallel to one of the at least two sides on the exterior of the device 108.

Figure 3:
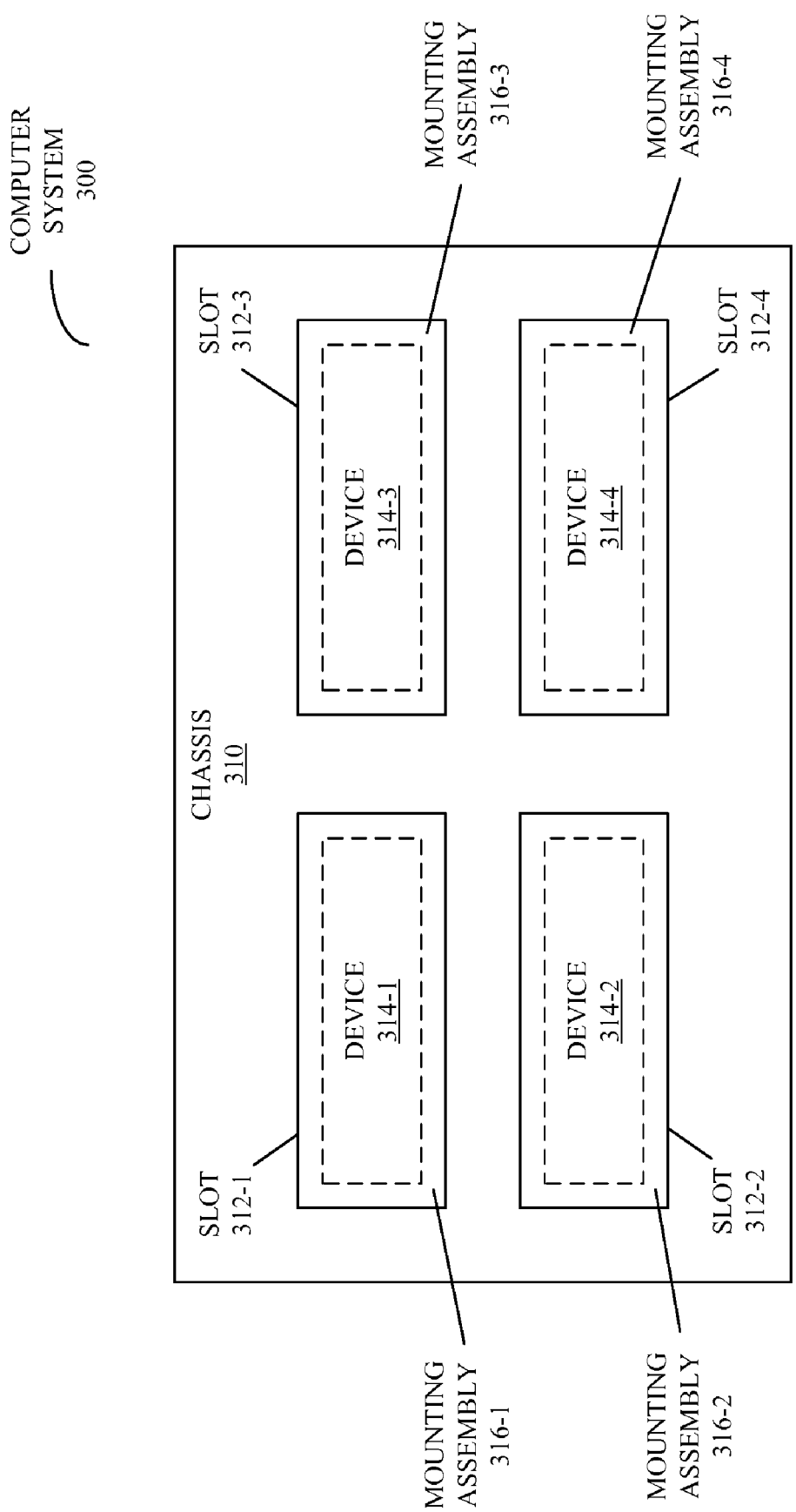
FIG. 3 is a block diagram illustrating a computer system in accordance with an embodiment of the present invention.

Mounting assembly 110 may include mechanical collars 120 (such as molded nylon) that are configured to mechanically couple to additional mechanical couplers that mechanically couple mounting assembly 110 to a chassis in a computer system (which is described further below with reference to FIG. 3). In particular, a given mechanical collar, such as mechanical collar 120-1, may be included in a given hole, such as hole 116-1, in the given side rail. For example, the additional mechanical couplers may include screws and the mechanical collars 120 may be threaded to mechanically couple to the screws.

Moreover, mounting assembly 110 may include energy-absorbing material 122 that encapsulates the mechanical collars 120. This energy-absorbing material may be positioned between an outer surface of the given mechanical collar and an inner surface of the given hole. Note that energy-absorbing material 122 may include: an elastomer, a rubber grommet and/or a foam composite.

In some embodiments, the given side rail has a top edge 124-1 and a bottom edge 124-2, and the given side rail includes at least two mechanically compliant structures 126 protruding above the top edge 124-1 at different positions along the top edge 124-1. For example, these mechanically compliant structures may include springs, which may be integrated into the given side rail. These mechanically compliant structures may include plastic. In some embodiments, different mechanically compliant structures, such as mechanically compliant structure 126-1 and 126-2, have different mechanical compliance, such as different stiffness values or spring constants.

Note that the mechanically compliant structures 126 may position device 108 in a slot in the chassis so that the top and bottom edges 124 of the given side rail are in contact with the slot (as described further below with reference to FIG. 2). (Thus, there may not be a gap(s) between the given side rail and the edges of the slot or enclosure in the chassis.) In this way, the mechanically compliant structures 126 may reduce the mechanical coupling of vibrations to device 108. Said differently, the mechanically compliant structures 126 may modify the natural frequencies of vibration modes of device 108 when installed in the chassis.

Figure 2:
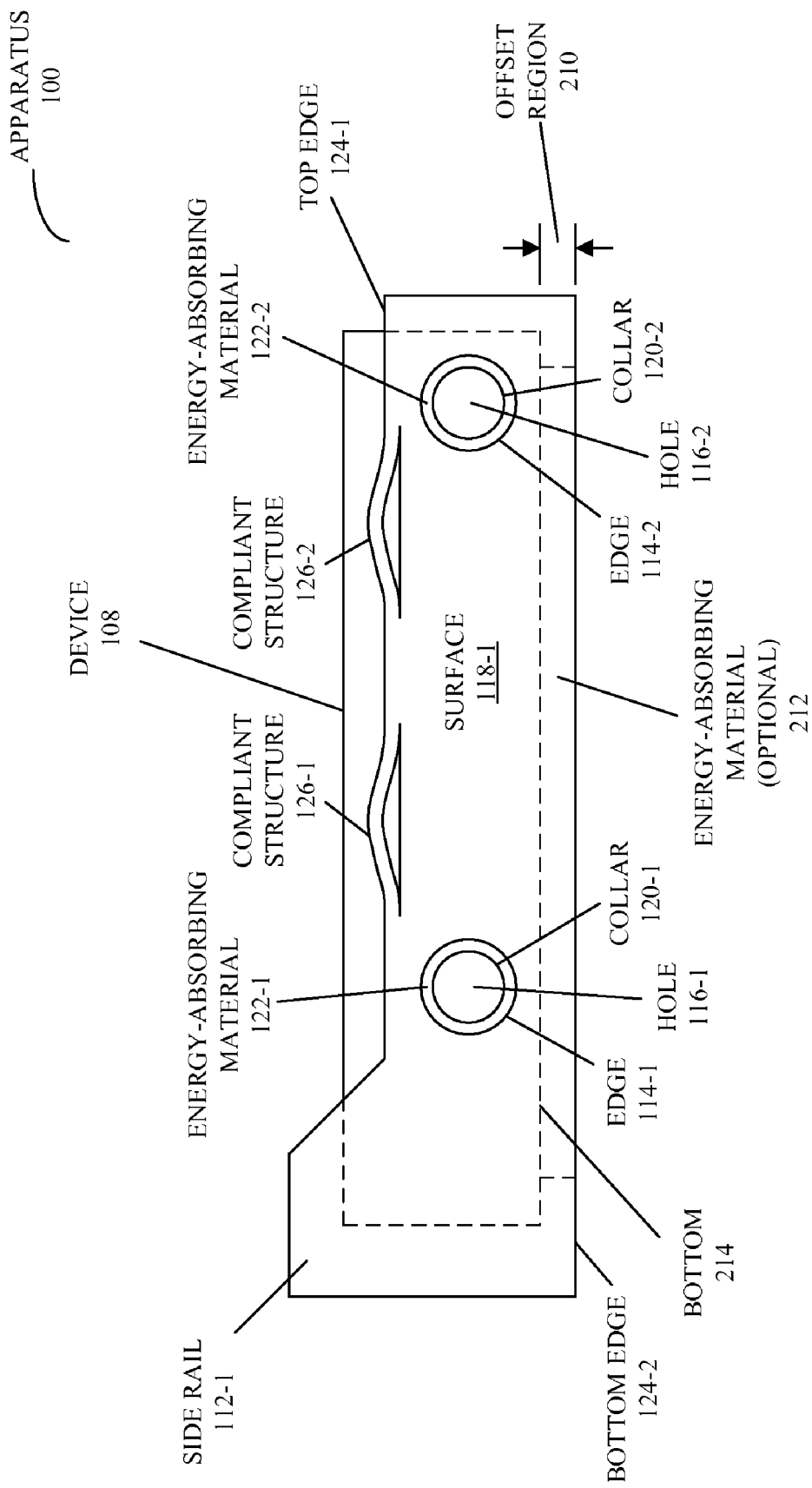
FIG. 2 is a block diagram illustrating an apparatus in accordance with an embodiment of the present invention.

As shown in FIG. 2, which presents a block diagram illustrating a side view of apparatus 100, in order to further reduce the coupling of vibrations to the device 108, mounting assembly 110 (FIG. 1) may include an offset region 210 between the bottom edge 124-2 and the bottom 214 of device 108 (which may be a side or an edge of a base casting). In particular, in conjunction with energy-absorbing material 122 around mounting collars 120 and mechanically compliant structures 126, this offset region may eliminate all direct mechanical contact between device 108 and the chassis. Instead, the chassis is in mechanical contact with mounting assembly 110 (FIG. 1), which, in turn, is in mechanical contact with device 108. In this configuration, mechanically compliant structures 126 may damp any vibrations before they are coupled to device 108.

In some embodiments, this damping is increased by including optional energy-absorbing material 212 (such as an elastomer) along a surface of the given side rail (for example, an inner surface) in the offset region 210 between the bottom edge 124-2 and the bottom 214 of device 108. Moreover, optional energy-absorbing material 212 may be integrated into the given side rail (for example, it may be co-molded with the given side rail) or may be mechanically coupled to the given side rail using an adhesive (such as a pressure-sensitive adhesive).

In an exemplary embodiment, the vibration-isolation and damping features are integrated into the mounting assembly, including: isolated screw mounts using co-molded damping material and a nylon washer (i.e., mechanical collars 120 and energy-absorbing material 122); a quad-spring design (i.e., mechanically compliant structures 126) for enhanced gap compensation and vibration damping; and/or an offset region 210 of 0.25 mm between the bottom edge 124-2 of the given rail and the bottom 214 of device 108 to eliminate a vibration transmission path.

We now describe embodiments of a computer system. FIG. 3 presents a block diagram illustrating a front view of a computer system 300. This computer system includes a chassis 310 with multiple slots 312. Devices 314 are installed in slots 312 using mounting assemblies 316 (such as mounting assembly 110 in FIGS. 1 and 2). Note that slots 312 may include drive slots. Moreover, in some embodiments mounting assemblies 316 may include chassis guides to align the devices 314 in the slots 312.

Note that in some embodiments apparatus 100 (FIGS. 1 and 2) and/or computer system 300 include fewer or additional components. For example, there may be additional mechanically compliant structures 126 (FIG. 1) for certain devices depending on the relative sensitivity of these devices to vibration. Alternatively, the mechanical compliance of the mechanically compliant structures 126 (FIGS. 1 and 2) may be adapted (for example, once or dynamically) based on the vibration sensitivity of a particular device or type of device.

Moreover, two or more components may be combined into a single component and/or a position of one or more components may be changed. For example, mechanically compliant structures may be included on the bottom edge 124-2 (FIGS. 1 and 2) instead of or in addition to the mechanically compliant structures 126 (FIGS. 1 and 2) on the top edge 124-1 (FIGS. 1 and 2). Alternatively or additionally, the mechanically compliant structures 126 (FIGS. 1 and 2) may provide vibration reduction along different principal axes or dimensions of device 108 (FIGS. 1 and 2), such as vertical and horizontal vibrations.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A mounting assembly for a device, comprising:
   two side rails configured to mechanically couple to at least two sides on an exterior of a device, wherein a given side rail includes one or more circumferential edges that define one or more holes on a surface and into an interior of the given side rail, and wherein the surface is approximately parallel to one of the at least two sides on the exterior of the device;
   mechanical collars configured to mechanically couple to mechanical couplers that mechanically couple the mounting assembly to a chassis in a computer system, wherein a given mechanical collar is included in a given hole in the given side rail;
   energy-absorbing material encapsulating the mechanical collars, wherein the energy-absorbing material is positioned between an outer surface of the given mechanical collar and an inner surface of the given hole; and
   at least two mechanically compliant structures protruding above a top edge of the given side rail at different positions along the top edge, wherein the mechanically compliant structures are configured to position the device in a slot in the chassis so that a bottom edge of the given side rail is in contact with the chassis, wherein the bottom edge of the given side rail does not include any protruding structures.

2. The mounting assembly of claim 1, wherein the two side rails are further configured to mechanically couple to each other.

3. The mounting assembly of claim 2, wherein the two side rails are configured to snap together, thereby maintaining positions of the two side rails relative to the exterior of the device and to each other.

4. The mounting assembly of claim 1, wherein the mechanical couplers include screws and the mechanical collars are threaded to mechanically couple to the screws.

5. The mounting assembly of claim 1, wherein the mechanical collars include molded nylon.

6. The mounting assembly of claim 1, wherein the energy-absorbing material includes an elastomer.

7. The mounting assembly of claim 1, wherein the device is sensitive to mechanical vibration or mechanical shock.

8. The mounting assembly of claim 7, wherein the device includes a storage device.

9. The mounting assembly of claim 7, wherein the device includes a hard-disk drive.

10. The mounting assembly of claim 1, wherein the mechanically compliant structures include springs.

11. The mounting assembly of claim 10, wherein the springs are integrated into the given side rail.

12. The mounting assembly of claim 1, wherein the given side rail has a top edge and a bottom edge; and
   wherein the given side rail is configured to mechanically couple to the device so that there is an offset between the bottom edge of the given side rail and a bottom surface of one of the at least two sides on the exterior of the device.

13. The mounting assembly of claim 12, further comprising energy-absorbing material mechanically coupled to another surface of the given side rail along a portion of the given side rail between the bottom surface of the one of the at least two sides on the exterior of the device and the bottom edge of the given side rail.

14. The mounting assembly of claim 13, wherein energy-absorbing material includes an elastomer.

15. The mounting assembly of claim 13, wherein energy-absorbing material is integrated into the given side rail.

16. The mounting assembly of claim 13, wherein energy-absorbing material is mechanically coupled to the given side rail using an adhesive.

17. An apparatus, comprising:
a device having at least two exterior sides; and
a mounting assembly mechanically coupled to the device, wherein the mounting assembly includes:
two side rails mechanically coupled to the at least two exterior sides, wherein a given side rail includes one or more circumferential edges that define one or more holes on a surface and into an interior of the given side rail, and wherein the surface is approximately parallel to one of the at least two exterior sides;
mechanical collars configured to mechanically couple to mechanical couplers that mechanically couple the mounting assembly to a chassis in a computer system, wherein a given mechanical collar is included in a given hole in the given side rail;
energy-absorbing material encapsulating the mechanical collars, wherein the energy-absorbing material is positioned between an outer surface of the given mechanical collar and an inner surface of the given hole; and
at least two mechanically compliant structures protruding above a top edge of the given side rail at different positions along the top edge, wherein the mechanically compliant structures are configured to position the device in a slot in the chassis so that a bottom edge of the given side rail is in contact with the chassis, wherein the bottom edge of the given side rail does not include any protruding structures.

18. A computer system, comprising:
a chassis having a slot;
a device having at least two exterior sides that is positioned in the slot and which is mechanically coupled to a mounting assembly; and
the mounting assembly, which is mechanically coupled to the device, wherein the mounting assembly includes:
two side rails mechanically coupled to the at least two exterior sides, wherein a given side rail includes one or more circumferential edges that define one or more holes on a surface and into an interior of the given side rail, and wherein the surface is approximately parallel to one of the at least two exterior sides;
mechanical collars that are mechanically coupled to the chassis by mechanical couplers, wherein a given mechanical collar is included in a given hole in the given side rail;
energy-absorbing material encapsulating the mechanical collars, wherein the energy-absorbing material is positioned between an outer surface of the given mechanical collar and an inner surface of the given hole; and
at least two mechanically compliant structures protruding above a top edge of the given side rail at different positions along the top edge, wherein the mechanically compliant structures are configured to position the device in a slot in the chassis so that a bottom edge of the given side rail is in contact with the chassis, wherein the bottom edge of the given side rail does not include any protruding structures.

19. The mounting assembly of claim 1, wherein the bottom edge of the given side rail is flat.

* * * * *